United States Patent
Lee et al.

(10) Patent No.: US 9,415,351 B2
(45) Date of Patent: Aug. 16, 2016

(54) HIGH PERMEATE FLUX REVERSE OSMOSIS MEMBRANE INCLUDING SURFACE-TREATED ZEOLITE AND METHOD OF MANUFACTURING THE SAME

(71) Applicants: LG CHEM, LTD., Seoul (KR); KOREA UNIVERSITY RESEARCH & BUSINESS FOUNDATION, Seoul (KR)

(72) Inventors: Young-Ju Lee, Daejeon (KR); Jong-Sung Yu, Chungcheongnam-do (KR); Jae-Hong Kim, Daejeon (KR); Chong-Kyu Shin, Daejeon (KR); Yun-Kyung Kim, Chungcheongnam-do (KR)

(73) Assignees: LG CHEM, LTD., Seoul (KR); KOREA UNIVERSITY RESEARCH & BUSINESS FOUNDATION, Seoul (KR)

( * ) Notice: Subject to any disclaimer, the term of this patent is extended or adjusted under 35 U.S.C. 154(b) by 0 days.

(21) Appl. No.: 14/005,902
(22) PCT Filed: Jun. 7, 2013
(86) PCT No.: PCT/KR2013/005052
§ 371 (c)(1),
(2) Date: Sep. 18, 2013
(87) PCT Pub. No.: WO2013/183969
PCT Pub. Date: Dec. 12, 2013

(65) Prior Publication Data
US 2015/0321151 A1    Nov. 12, 2015

(30) Foreign Application Priority Data

Jun. 8, 2012  (KR) .................. 10-2012-0061812
Jun. 7, 2013  (KR) .................. 10-2013-0065379

(51) Int. Cl.
  *B01D 39/00*     (2006.01)
  *B01D 39/14*     (2006.01)
  (Continued)

(52) U.S. Cl.
  CPC .......... *B01D 69/125* (2013.01); *B01D 67/0079* (2013.01); *B01D 67/0093* (2013.01);
  (Continued)

(58) Field of Classification Search
  CPC .. B01D 67/0079; B01D 69/148; B01D 71/56; B01D 61/025; B01D 69/125; B01D 2323/30; B01D 69/10; B01D 69/12; B01D 2323/40; B01D 61/02; B01D 67/0093; B01D 69/141
  USPC .......................................... 210/500.38, 502.1
  See application file for complete search history.

(56) References Cited

U.S. PATENT DOCUMENTS 6,248,682 B1 *  6/2001  Thompson ............. C08G 77/20
                                                     502/4
7,109,140 B2 *  9/2006  Marand ................ B01D 53/228
                                                     502/4
(Continued)

FOREIGN PATENT DOCUMENTS

CN   102089068 A    6/2011
CN   102114392 A    7/2011
(Continued)

OTHER PUBLICATIONS

Chinese Office Action for Application No. 201380002483.2, issued Apr. 16, 2015.
(Continued)

*Primary Examiner* — Ana Fortuna

(57) ABSTRACT

The present invention relates to a reverse osmosis membrane including: a porous support; and a polyamide active layer formed on the porous support and including zeolite, surface-treated with a compound having at least one functional group selected from a group consisting of an amino group and a glycidyl group, and a method of manufacturing the same.

5 Claims, 1 Drawing Sheet

500nm

(51) Int. Cl.
  *B05D 5/00*    (2006.01)
  *B01D 69/12*   (2006.01)
  *C01B 39/38*   (2006.01)
  *B01D 67/00*   (2006.01)
  *B01D 69/14*   (2006.01)
  *B01D 71/56*   (2006.01)
  *B01D 61/02*   (2006.01)
  *B01D 71/02*   (2006.01)

(52) U.S. Cl.
  CPC .............. *B01D69/12* (2013.01); *B01D 69/148* (2013.01); *B01D 71/56* (2013.01); *C01B 39/38* (2013.01); *B01D 61/025* (2013.01); *B01D 71/028* (2013.01); *B01D 2325/12* (2013.01)

(56) References Cited

U.S. PATENT DOCUMENTS

| | | | | |
|---|---|---|---|---|
| 7,897,201 | B2* | 3/2011 | Yuasa | B82Y 10/00 216/63 |
| 8,029,857 | B2* | 10/2011 | Hoek | B01D 67/0079 210/490 |
| 8,721,891 | B2* | 5/2014 | Satou | B01D 71/028 210/490 |
| 8,865,116 | B2* | 10/2014 | Yu | C01G 49/06 423/633 |
| 8,875,906 | B2* | 11/2014 | Kim | B01D 67/0088 210/490 |
| 2003/0220188 | A1 | 11/2003 | Marand et al. | |
| 2008/0138914 | A1* | 6/2008 | Popovic | G01N 33/582 436/536 |
| 2008/0237126 | A1 | 10/2008 | Hoek et al. | |
| 2010/0224555 | A1 | 9/2010 | Hoek et al. | |
| 2012/0261344 | A1 | 10/2012 | Kurth et al. | |
| 2012/0285890 | A1* | 11/2012 | Koehler | B01D 67/0079 210/651 |
| 2016/0038885 | A1* | 2/2016 | Hogen-Esch | B01D 69/148 210/321.6 |

FOREIGN PATENT DOCUMENTS

| | | | |
|---|---|---|---|
| CN | 102430349 | A | 5/2012 |
| JP | 2008-75227 | A | 4/2008 |
| JP | 2010-540215 | A | 12/2010 |
| KR | 10-1996-0013437 | A | 5/1996 |
| KR | 10-2000-0059809 | A | 10/2000 |
| KR | 10-2005-0103992 | A | 11/2005 |
| KR | 10-2010-0083700 | A | 7/2010 |
| KR | 10-2011-0011626 | A | 2/2011 |
| WO | WO 2009/039467 | A1 | 3/2009 |
| WO | WO 2009/129354 | A2 | 10/2009 |
| WO | WO 2010/082710 | A1 | 7/2010 |
| WO | WO 2010/123926 | A2 | 10/2010 |

OTHER PUBLICATIONS

Hang Dong et al., "Preparation and characterization of surface-modified zeolite-polyamide thin film nanocomposite membranes for desalination", Desalination and Water Treatment, Oct. 2011, pp. 6-12, vol. 34.

Office Action from Japanese Patent Office for Application No. 2014-520153, dated Oct. 6, 2015.

Office Action from Chinese Patent Office for Application No. 201380002483.2, dated Dec. 7, 2015.

Extended European Search Report for European Patent Application No. 13800894.1 dated Feb. 9, 2016.

* cited by examiner

HIGH PERMEATE FLUX REVERSE OSMOSIS MEMBRANE INCLUDING SURFACE-TREATED ZEOLITE AND METHOD OF MANUFACTURING THE SAME

TECHNICAL FIELD

The present invention relates to a high permeate flux reverse osmosis membrane including surface-treated zeolite and a method of manufacturing the same.

BACKGROUND ART

Separation membranes are classified into micro-filtration (MF) membranes, ultra-filtration (UF) membranes, nano-filtration (NF) membranes, reverse osmosis (RO) membranes, and the like, according to a pore size thereof. Meanwhile, the reverse osmosis membrane, a type of semipermeable membrane, may remove salts from brackish water, sea water and the like, using a principle of causing a solution and a solute to be separated in predetermined directions when an aqueous solution having salts dissolved therein is pressurized in one direction, thereby being able to be used to desalinate a great quantity of water for industrial, agricultural, domestic and other purposes, into relatively lower-salinity water.

More specifically, brackish and sea water desalination processes using the reverse osmosis membrane refer to processes of filtering salts, ions or the like, dissolved in an aqueous solution through a reverse osmosis membrane and allowing refined water to pass through the membrane, when the reverse osmosis membrane passes through the aqueous solution having salts, ions or the like dissolved therein while pressure is applied to the aqueous solution. At this time, the level of applied pressure needs to be greater than that of osmotic pressure. Accordingly, osmotic pressure is higher in accordance with an increase in salinity of the aqueous solution and consequently, the pressure required to be applied to supply water may be increased, causing the depletion of a greater amount of energy.

Thus, in order to desalinate brackish water, sea water and the like, containing a great deal of salts, a reverse osmosis membrane needs to have properties allowing a great quantity of water to pass therethrough, even at relatively low pressure, that is, high permeate flux properties, as well as having salt removal capabilities.

Korean Patent Registration No. 0477590 (Oct. 5, 2000), relating to 「a method of manufacturing a reverse osmosis membrane with high flux」, discloses a method of manufacturing a reverse osmosis membrane with high flux, the method being characterized in that a film formed through interfacial polymerization occurring on a surface of a support layer by bringing an organic solvent containing an amine reactive compound such as a polyfunctional acyl halide or the like and phosphinyl alkyl chloride dissolved therein into contact with the support layer, after coating at least one aqueous polyfunctional amine solution on the support layer and removing an excessive amount of the solution therefrom, is washed using an aqueous basic solution to thereby manufacture a reverse osmosis membrane. In the above related art, phosphinyl alkyl chloride is added at the time of the interfacial polymerization through which a polyamide active layer is formed, and the phosphinyl alkyl chloride may be involved in the interfacial polymerization and serve to densely form a fine surface structure while having high degrees of fluidity and integrity. However, although the related art has advantages of increasing a permeate flux, it has defects in that a predetermined level of a salt rejection rate may not be maintained and deviation thereof may be significant.

Meanwhile, Korean Patent Laid-Open Publication No. 1996-0013437 (May 22, 1996), relating to 「a method of manufacturing a reverse osmosis module housing having antibiosis」, discloses a reverse osmosis module housing having improved bacteria removal capabilities and excellent antibiosis, the reverse osmosis module housing being manufactured by combining a module element formed by winding a complex semipermeable membrane including a porous support stacked on a non-woven polyester fabric and an active layer (a crosslinked polyamide ultrathin film) obtained by interfacially polymerizing a polyfunctional amine solution and a polyfunctional halide solution on the surface of the porous support, in a spiral wound manner, with a module housing fabricated by mixing a polypropylene resin and zeolite with a compound having silver and copper absorbed therein. However, the reverse osmosis module housing is formed by combining the module element obtained by winding the complex semipermeable membrane in the spiral wound manner, with the module housing including zeolite, and the reverse osmosis module housing is merely provided to improve antibiosis. Thus, the reverse osmosis module housing is not associated with a permeate flux and a salt rejection rate of the polyamide active layer. Further, a structure thereof is complex and thus, various fields of application thereof are restricted.

Thus, the present invention is provided by the applicant thereof as a result of repeated research in order to improve a permeate flux and a salt rejection rate of a reverse osmosis membrane.

DISCLOSURE

Technical Problem

An aspect of the present invention provides a method of manufacturing a reverse osmosis membrane having an improved permeate flux and salt rejection rate, and a reverse osmosis membrane formed using the same.

Technical Solution

According to an aspect of the present invention, there is provided a reverse osmosis membrane including: a porous support; and a polyamide active layer formed on the porous support and including zeolite, surface-treated with a compound having at least one functional group selected from a group consisting of an amino group and a glycidyl group.

The compound may be a silane compound having the at least one functional group selected from the group consisting of the amino group and the glycidyl group.

The surface-treated zeolite may be zeolite, surface-treated with the compound having the amino group, and the amino group may be chemically bonded to the polyamide active layer.

The zeolite may have an MFI (Zeolite Socony Mobil-five) type structure, an LTA (Zeolite A) type structure, or a FAU (Faujasite) type structure.

A difference between a maximum particle diameter and a minimum particle diameter of the surface-treated zeolite may be 10 to 200 nm.

An average particle diameter of the surface-treated zeolite may be 50 to 200 nm.

According to another aspect of the present invention, there is provided a method of manufacturing a reverse osmosis membrane, the method including: forming a porous support; and forming a polyamide active layer on the porous support by interfacially polymerizing a polyfunctional amine solution including surface-treated zeolite and a polyfunctional acid halide compound solution.

The surface-treated zeolite may be included in an amount of 0.001 wt % to 1 wt % with respect to 100 wt % of the polyfunctional amine solution.

Effects of Invention

According to the present invention, due to a polyamide active layer including zeolite, surface-treated with a compound having at least one functional group selected from a group consisting of an amino group and a glycidyl group, a reverse osmosis membrane having an improved permeate flux while having a salt rejection rate maintained at a predetermined level or more can be manufactured.

EXPLANATION OF REFERENCE NUMERALS

Figure 1:
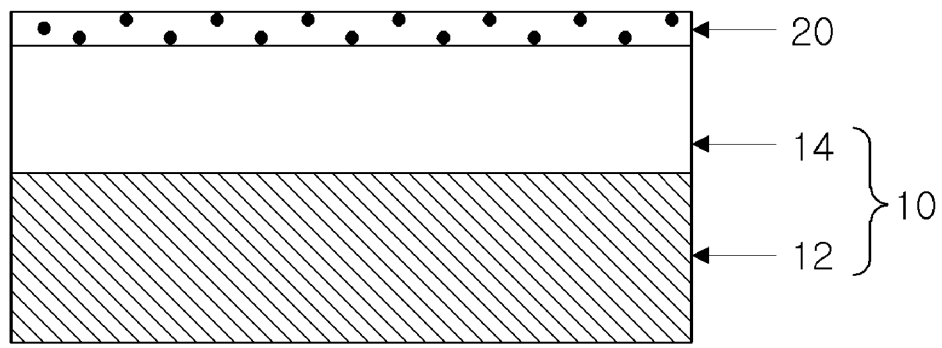
FIG. 1 is a view illustrating a reverse osmosis membrane including a polyamide active layer including surface-treated zeolite according to an embodiment of the present invention.

10: Porous Support
12: Non-Woven Fabric
14: Polymer Material Layer
20: Polyamide Active Layer

BEST MODE FOR INVENTION

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

FIG. 1 illustrates a reverse osmosis membrane according to an embodiment of the present invention. As illustrated in FIG. 1, a reverse osmosis membrane according to an embodiment of the present invention may include a porous support 10 and a polyamide active layer 20 formed on the porous support 10 and including zeolite, surface-treated with a compound having at least one functional group selected from a group consisting of an amino group and a glycidyl group.

The porous support 10 may be what a polymer material layer 14 is formed on a non-woven fabric 12, and a material for the non-woven fabric may be, for example, polyester, polycarbonate, fine porous polypropylene, polyphenylene ether, poly fluoride vinylidene or the like, but is not limited thereto.

A polymer material for the polymer material layer may be one selected from a group consisting of, for example, polysulfone, polyether sulfone, polyethylene oxide, polyimide, polyamide, polyetherimide, polyether ether ketone, polyacrylonitrile, polymethylmethacrylate, polyethylene, polypropylene, polymethylpentene, poly methyl chloride and polyvinylidene fluoride.

The porous support 10 may have a thickness of 100 to 200 μm, 120 to 170 μm, or 140 to 150 μm. The reason for this is that when the thickness of the porous support 10 is below 100 μm, the porous support 10 may not tolerate pressure applied thereto at the time of operating a water-treated reverse osmosis membrane to cause damage to the reverse osmosis membrane, while when the thickness of the porous support 10 is greater than 200 μm, surface roughness may be increased and a pathway through which water is discharged during the discharging of water may be extended, thereby leading to a lowering in the performance of the membrane.

In addition, the porous support 10 has a fine porous structure. As the porous support 10, any material may be used without specific limitation, as long as the material may have a pore size sufficient to penetrate water and may serve as a support for forming the polyamide active layer. The pore size of the porous support 10 may be 1 to 500 nm, or preferably, 10 to 70 nm. When the pore size of the porous support 10 is outside of the numerical range, the polyamide active layer 20 penetrates into pores of the porous support 10, causing difficulty in smooth layer formation or resulting in a lowering in permeate flux. At this time, the pore size refers to an opening size.

Meanwhile, the polyamide active layer 20 is formed on the porous support 10 and serves to eliminate salts. In the present invention, the polyamide active layer 20 includes the surface-treated zeolite.

In this case, the zeolite may be natural zeolite or synthetic zeolite. However, in consideration of a particle size of zeolite and uniformity in a particle shape thereof, the zeolite may preferably be synthetic zeolite. In addition, as a method of synthesizing zeolite, a method commonly known in the art may be used without specific limitation. The zeolite may be synthesized using hydrothermal synthesis.

Meanwhile, a basic unit of the zeolite is $TO_4$, and in this case, the "T" is not limited but may be at least one selected from a group consisting of silicon (Si), aluminum, and titanium.

Meanwhile, in the present invention, the zeolite is surface-treated with the compound having the at least one functional group selected from the group consisting of the amino group and the glycidyl group, to thereby be used.

Since the zeolite surface-treated with the compound having the at least one functional group selected from the group consisting of the amino group and the glycidyl group has high dispersibility in an aqueous solution, when the zeolite surface-treated with the functional group is used, zeolite particles may be uniformly included in the polyamide active layer 20.

Meanwhile, the amino group may be a substituted or non-substituted amino group and for example, may be a non-substituted amino group, amino alkyl group, alkyl amino group, amino alkylene group, or alkylene amino group. In addition, the glycidyl may be a substituted or non-substituted glycidyl.

In particular, in the case of using the zeolite surface-treated with the amino group, the amino group in a zeolite surface may be involved in the interfacial polymerization through which the polyamide active layer 20 is formed. That is, the amino group in the zeolite surface may react with a polyfunctional acid halide compound to be chemically bonded to the polyamide active layer 20. As a result, adhesion between the polyamide active layer 20 and the zeolite may be further enhanced, the zeolite may not cause defects in the polyamide active layer 20, and the zeolite may be uniformly included in the polyamide active layer 20.

Meanwhile, in the present invention, the surface-treatment of the zeolite refers to forming a bond such as a hydrogen bond, an ion bond, or a covalent bond, between at least one functional group selected from a group consisting of an amino group and a glycidyl group, and a functional group in the zeolite surface.

Further, the surface-treated zeolite may be a material surface-treated with a silane compound having the at least one functional group selected from the group consisting of the amino group and the glycidyl group. The silane compound is advantageous in that it is harmless to humans. In addition, in the case of surface-treating the zeolite with the silane compound, a stable bond between the silane compound and the functional group in the zeolite surface may be formed.

The silane compound having the at least one functional group selected from the group consisting of the amino group and the glycidyl group may be a primary amine silane compound, a secondary amine silane compound, and/or a tertiary amine silane compound. The silane compound is not limited but may be at least one selected from a group consisting of 3-aminopropyltriethoxysilane, 3-aminopropyltrimethoxysilane, 4-aminobutyltriethoxysilane, and glycidoxypropyltrimethoxysilane, for example.

Meanwhile, structures of the zeolite may be classified as an MFI (Zeolite Socony Mobil-five) type structure, an LTA (Zeolite A) type structure, or a FAU (Faujasite) type structure according to a method of connecting units configuring the zeolite. As the zeolite, in the case of using zeolite having the MFI type structure, fine zeolite particles having a uniform size may be easily obtained.

Meanwhile, the surface-treated zeolite may have micropores, radiuses of which are within a range of approximately 1.5 Å to 3.5 Å. When the surface-treated zeolite has micropores satisfying the numerical range, sizes of the micropores are smaller than those of $Na^+$ (the radius of a hydrated ion is 4.2 Å) and $Cl^-$ (the radius of a hydrated ion is 3.9 Å) ions, removal efficiency of $Na^+$ and $Cl^-$ ions may be increased. In addition, the zeolite may have regular micropores.

Meanwhile, an average particle diameter of the surface-treated zeolite may be 50 to 200 nm. Alternatively, the average particle diameter of the surface-treated zeolite may be 70 to 160 nm. When the average particle diameter of the zeolite is less than 50 nm, it may be difficult to uniformly synthesize the zeolite. In addition, when the average particle diameter of the zeolite is greater than 200 nm, a surface defect may occur in the zeolite.

A difference between a maximum particle diameter and a minimum particle diameter of the surface-treated zeolite may be 10 to 200 nm. In addition, the difference between the maximum particle diameter and the minimum particle diameter of the surface-treated zeolite may be 20 to 120 nm or 100 to 150 nm. Even in a case in which the difference satisfies the numerical range, a salt rejection rate may be maintained to be equal to or greater than a predetermined value within an error range, while permeate flux performance may be improved.

Meanwhile, the polyamide active layer 20 according to the embodiment of the present invention may be formed by interfacially polymerizing a polyfunctional amine solution including the surface-treated zeolite and a polyfunctional acid halide compound solution. In the present invention, since a hydrophilic functional group such as an amino group and/or a glycidyl group is present in the zeolite surface, the zeolite may be smoothly dispersed within the polyfunctional amine solution, and the hydrophilic functional group reacts with the polyfunctional acid halide compound, such that the zeolite particles are uniformly distributed within the polyamide active layer 20.

Meanwhile, in the present invention, the polyamide active layer 20 may have a thickness of approximately several hundred nanometers, and for example, may have a thickness of 150 to 200 nm. Moreover, a virtual pore of the polyamide active layer 20 may have a diameter of 1 to 10 Å, 2 to 5 Å, or 2 to 3 Å.

Next, a method of manufacturing the reverse osmosis membrane according to the embodiment of the present invention will be described. The method of manufacturing the reverse osmosis membrane according to the embodiment of the present invention, may include forming the porous support and forming the polyamide active layer on the porous support by interfacially polymerizing the polyfunctional amine solution including the zeolite surface-treated with the compound having the at least one functional group selected from the group consisting of the amino group and the glycidyl group and the polyfunctional acid halide compound solution.

The forming of the porous support may be performed by, for example, a method of forming a polymer material layer on a non-woven fabric. In this case, the forming of the polymer material layer may be performed by a method commonly known in the art, for example, a casting method, a coating method, a dipping method, or the like. A material for the non-woven fabric, a polymer material for the polymer material layer, and a thickness of the porous support, and a pore size of the porous support are the same as those described above and thus, descriptions thereof will be omitted.

Meanwhile, the forming of the polyamide active layer may include, for example, bring the polyfunctional amine solution including the surface-treated zeolite into contact with the porous support; and bring the polyfunctional acid halide compound solution into contact with the polyfunctional amine solution. At this time, a polyfunctional amine compound and the polyfunctional acid halide compound may be interfacially polymerized to form the polyamide active layer.

In this case, the polyfunctional amine solution is not limited, but may be a solution including, for example, m-phenylenediamine, p-phenylenediamine, 1,3,6-benzene triamine, 4-chloro-1,3-phenylenediamine, 6-chloro-1,3-phenylenediamine, or 3-chloro-1,4-phenylenediamine, or a mixture thereof. In the polyfunctional amine solution, a solvent thereof may be water.

Meanwhile, the surface-treated zeolite may be included in an amount of 0.001 wt % to 1 wt %, with respect to the overall weight of the polyfunctional amine solution. In addition, the surface-treated zeolite may be included in an amount of 0.01 wt % to 0.1 wt %, with respect to the overall weight of the polyfunctional amine solution. When the surface-treated zeolite is included in an amount greater than 1 wt % with respect to 100 wt % of the polyfunctional amine solution, dispersion of the zeolite may not be effectively performed to cause defects in the active layer of the reverse osmosis membrane, thereby lowering the salt rejection rate. On the other hand, when the surface-treated zeolite is included in an amount lower than 0.001 wt % with respect to 100 wt % of the polyfunctional amine solution, the amount of the zeolite is insufficient to effectively contribute to improvements in performance, and consequently, a reverse osmosis membrane including the zeolite in an amount lower than 0.001 wt % may have no difference from a reverse osmosis membrane including no zeolite.

The polyfunctional acid halide compound solution may be fabricated by dissolving at least one reactant selected from a group consisting of a polyfunctional acyl halide, a polyfunctional sulfonyl halide, and a polyfunctional isocyanate in an organic solvent. The polyfunctional acyl halide usable in the present invention may be at least one selected from a group consisting of trimesoyl chloride (TMC), isophthaloyl chloride (IPC) and terephthaloyl chloride (TPC).

The organic solvent is not limited but may be a halogenated hydrocarbon such as Freon, or an aliphatic hydrocarbon solvent such as an n-alkane having 8 to 12 carbon atoms or the like. As the organic solvent, a hydrophobic liquid not mixed with water may be used. As specific examples, an organic solvent such as hexane, cyclohexane, or heptanes may be used, and a mixture of an alkane having 8 to 12 carbon atoms, a product of Isol-C (by Exxon.), Isol-G (by Exxon.), or the like may be used.

Meanwhile, the contact is not particularly limited but may be performed by a solution contact method commonly known in the art, for example, a dipping method, a coating method, a spraying method or the like.

In addition, the manufacturing method of the present invention may further include removing an excessive amount of the solution, after the contact of the polyfunctional amine solution and/or the contact of the polyfunctional acid halide solution, as needed. Further, a drying process may be further included after the removing of the excessive amount of the solution, as needed.

In addition, the manufacturing method of the present invention may further include a cleaning process and/or a drying process after the forming of the polyamide active layer and in this case, a cleansing solution used in the cleaning process may be water. The time required for the cleaning process is not particularly limited, but a period of time equal to or greater than 12 hours and equal to or less than one day may be required therefore. In addition, the drying process is not particularly limited but may be performed for 1 hour or less.

MODE FOR INVENTION

Hereinafter, the present invention will be described in detail through examples.

Fabrication Example 1

Fabrication of Porous Support 18 wt % of a polysulfone solid was added to an N,N-dimethylformamide (hereinafter, referred to as "DMF") solution and dissolved therein at a temperature of 80 to 85° C. for 12 hours or more to obtain a homogeneous liquid phase of polysulfone. The polysulfone fabricated as above was cast on a non-woven fabric formed of a polyester material and having a thickness of 95 to 100 μm, at a thickness of 45 to 50 μm and was then dipped in water. Thereby, a porous support including a polysulfone layer was obtained.

Fabrication Example 2

Synthesis of Zeolite (I)

0.34 g of aluminum isopropoxide was added to a mixed solution including 30.6 g of tetrapropylammonium hydroxide (hereinafter, referred to as "TPAOH") and 11.7 g of deionized water (hereinafter, referred to as "DIW") and was stirred therein for 1 hour. Then, after 17 g of tetraethyl orthosilicate (hereinafter, referred to as "TEOS") was added thereto and stirred for 3 days, the stirred mixed solution was put into an autoclave and was subject to a hydrothermal reaction for 24 hours at 90° C. MFI type zeolite generated by cooling the autoclave at room temperature was cleaned with DIW several times, using a centrifugal separator and then was dried at 70° C. The dried zeolite was fired at 550° C. for 5 hours to fabricate zeolite (I).

The zeolite (I) fabricated by the method had an average particle diameter of 90 nm, a minimum particle diameter of 80 nm, and a maximum particle diameter of 100 nm. In this case, in order to measure the particle diameters, a scanning electron microscope (SEM) was used.

Fabrication Example 3

Synthesis of Zeolite (II)

0.34 g of aluminum isopropoxide was added to a mixed solution including 30.6 g of TPAOH and 11.7 g of DIW and was stirred therein for 1 hour. Then, after 17 g of TEOS was added thereto and stirred for 3 days, the stirred mixed solution was put into an autoclave and was subject to a hydrothermal reaction for 24 hours at 90° C. MFI type zeolite generated by cooling the autoclave at room temperature was cleaned with DIW several times using a centrifugal separator and then, the remaining non-precipitated solution was reinserted into the autoclave and was subject to a hydrothermal reaction for 7 hours at 180° C., again. MFI type zeolite generated by cooling the autoclave at room temperature was cleaned with DIW several times using the centrifugal separator and then, was dried at 70° C. The dried zeolite was fired at 550° C. for 5 hours to fabricate zeolite (II).

The zeolite (II) fabricated by the method had an average particle diameter of 150 nm, a minimum particle diameter of 80 nm, and a maximum particle diameter of 200 nm. In this case, in order to measure the particle diameters, a scanning electron microscope (SEM) was used.

Fabrication Example 4

Synthesis of Zeolite (III)

0.34 g of aluminum isopropoxide was added to a mixed solution including 30.6 g of TPAOH and 11.7 g of DIW and was stirred therein for 1 hour. Then, after 17 g of TEOS was added thereto and stirred for 3 days, the stirred mixed solution was put into an autoclave and was subject to a hydrothermal reaction for 24 hours at 90° C. MFI type zeolite generated by cooling the autoclave at room temperature was cleaned with DIW several times using a centrifugal separator and then, the remaining non-precipitated solution was reinserted into the autoclave and was subject to a hydrothermal reaction for 24 hours at 120° C., again. MFI type zeolite generated by cooling the autoclave at room temperature was cleaned with DIW several times using the centrifugal separator and then, was dried at 70° C. The dried zeolite was fired at 550° C. for 5 hours to fabricate zeolite (III).

The zeolite (III) fabricated by the method had an average particle diameter of 80 nm, a minimum particle diameter of 50 nm, and a maximum particle diameter of 100 nm. In this case, in order to measure the particle diameters, a scanning electron microscope (SEM) was used.

Fabrication Example 5

Zeolite (IV)

500 ml of ethanol (EtOH), 40 ml of DIW, 20 ml of ammonium hydroxide ($NH_4OH$) were mixed and stirred and then, 0.5 g of zeolite (I) fabricated according to Fabrication Example 2 was added thereto and stirred therein. After 5 ml of 3-aminopropyl triethoxysilane was added to the stirred mixed solution and stirred for 30 minutes, the stirred solution was sealed and left in an oven of 80° C. for 4 hours and zeolite was separated therefrom using a centrifugal separator to thereby obtain surface-treated zeolite (IV).

Figure 2:
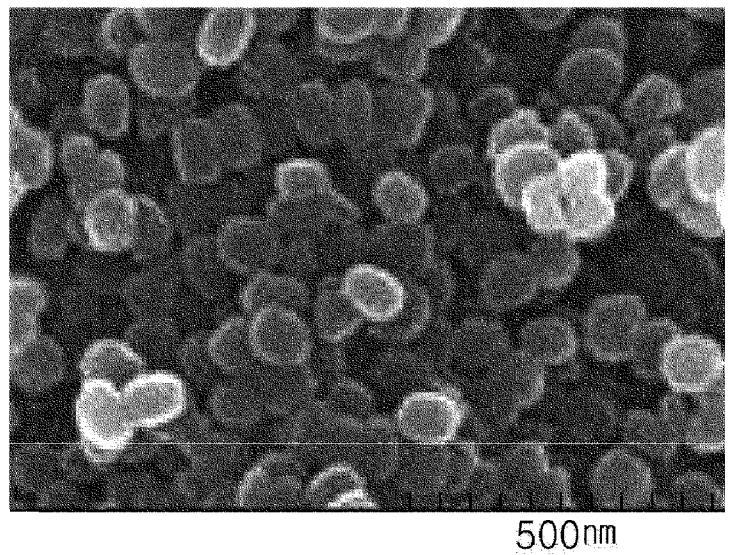
FIG. 2 shows an image obtained by observing surface-treated zeolite (IV) fabricated according to Fabrication Example 5 of the present invention, using a scanning electron microscope (SEM).

As a result of observing the surface-treated zeolite (IV) using a scanning electron microscope (SEM), it could be confirmed that MFI type structure zeolite having a uniform particle size was synthesized as illustrated in FIG. 2.

Fabrication Example 6

Zeolite (V)

Zeolite (V), surface treated with the same method as that of Fabrication Example 5 was obtained, with exception that zeolite (II) fabricated according to Fabrication Example 3 was used, instead of the zeolite (I) fabricated according to Fabrication Example 2.

Fabrication Example 7

Zeolite (VI)

Zeolite (VI), surface treated with the same method as that of Fabrication Example 5 was obtained, with exception that zeolite (III) fabricated according to Fabrication Example 4 was used, instead of the zeolite (I) fabricated according to Fabrication Example 2.

Fabrication Example 8

Zeolite (VII)

500 ml of ethanol (EtOH), 40 ml of DIW, 20 ml of ammonium hydroxide ($NH_4OH$) were mixed and stirred, and then, 0.5 g of zeolite (II) fabricated according to Fabrication Example 3 was added thereto and stirred therein. After 5 ml of chlorodimethyl octadecylsilane was added to the stirred mixed solution and stirred for 30 minutes, the stirred solution was sealed and left in an oven of 80° C. for 4 hours and zeolite was separated therefrom using a centrifugal separator to thereby obtain surface-treated zeolite (VII).

Example 1

The porous support fabricated according to Fabrication Example 1 was dipped in an aqueous solution including 2 wt % of m-phenylenediamine (hereinafter, referred to as 'MPD') and 0.01 wt % of the surface-treated zeolite (IV) obtained according to Fabrication Example 5 for 2 minutes. In this case, in order to disperse particles of the zeolite (IV), sonication was performed thereon for 1 hour. Next, an excessive amount of the aqueous solution on the porous support was removed using a roller under 25 psi of pressure and the porous support was then dried for 1 minute at room temperature. Thereafter, after the coated porous support was dipped in a polyfunctional acid halide compound solution including 0.1 wt %/v % of 1,3,5-benzenetricarbonyl trichloride (hereinafter, referred to as "TMC") with an ISOL-C(SKC Corp.) solvent for 1 minute, interfacial polymerization was terminated and the support was dried for 10 minutes in an oven at 60° C. in order to remove an excessive amount of the organic solution. Thereafter, a reverse osmosis membrane obtained by the method was washed in 0.2 wt % of an aqueous sodium carbonate solution for two hours or more at room temperature and then washed with distilled water. Through the method described above, a reverse osmosis membrane having a thickness of 180 µm was thereby obtained.

Example 2

A reverse osmosis membrane was fabricated using the same method as that of Example 1, with the exception that 1 wt % of the surface-treated zeolite (IV) obtained according to Fabrication Example 5 was used, instead of 0.01 wt % of the surface-treated zeolite (IV) obtained according to Fabrication Example 5.

Example 3

A reverse osmosis membrane was fabricated using the same method as that of Example 1, with the exception that 0.01 wt % of the surface-treated zeolite (V) obtained according to Fabrication Example 6 was used, instead of 0.01 wt % of the surface-treated zeolite (IV) obtained according to Fabrication Example 5.

Example 4

A reverse osmosis membrane was fabricated using the same method as that of Example 1, with the exception that 0.1 wt % of the surface-treated zeolite (V) obtained according to Fabrication Example 6 was used, instead of 0.01 wt % of the surface-treated zeolite (IV) obtained according to Fabrication Example 5.

Example 5

A reverse osmosis membrane was fabricated using the same method as that of Example 1, with the exception that 1 wt % of the surface-treated zeolite (V) obtained according to Fabrication Example 6 was used, instead of 0.01 wt % of the surface-treated zeolite (IV) obtained according to Fabrication Example 5.

Example 6

A reverse osmosis membrane was fabricated using the same method as that of Example 1, with the exception that 0.01 wt % of the surface-treated zeolite (VI) obtained according to Fabrication Example 7 was used, instead of 0.01 wt % of the surface-treated zeolite (IV) obtained according to Fabrication Example 5.

Example 7

A reverse osmosis membrane was fabricated using the same method as that of Example 1, with the exception that 0.1 wt % of the surface-treated zeolite (VI) obtained according to Fabrication Example 7 was used, instead of 0.01 wt % of the surface-treated zeolite (IV) obtained according to Fabrication Example 5.

Example 8

A reverse osmosis membrane was fabricated using the same method as that of Example 1, with the exception that 1 wt % of the surface-treated zeolite (VI) obtained according to Fabrication Example 7 was used, instead of 0.01 wt % of the surface-treated zeolite (IV) obtained according to Fabrication Example 5.

Comparative Example 1

A reverse osmosis membrane was fabricated using the same method as that of Example 1, with the exception that the zeolite was not added thereto.

Comparative Example 2

A reverse osmosis membrane was fabricated using the same method as that of Example 1, with the exception that 0.1 wt % of the surface-treated zeolite (I) obtained according to Fabrication Example 2 was used, instead of 0.01 wt % of the surface-treated zeolite (IV) obtained according to Fabrication Example 5.

Comparative Example 3

A reverse osmosis membrane was fabricated using the same method as that of Example 1, with the exception that 0.1 wt % of the surface-treated zeolite (III) obtained according to Fabrication Example 4 was used, instead of 0.01 wt % of the surface-treated zeolite (IV) obtained according to Fabrication Example 5.

Comparative Example 4

A reverse osmosis membrane was fabricated using the same method as that of Example 1, with the exception that 0.01 wt % of the surface-treated zeolite (VII) obtained according to Fabrication Example 8 was used, instead of 0.01 wt % of the surface-treated zeolite (IV) obtained according to Fabrication Example 5.

Experimental Example 1

A reverse osmosis membrane cell apparatus used in membrane evaluation included a flat panel type permeation cell, a high pressure pump, a reservoir, and a cooling device. The flat panel type permeation cell had a cross-flow structure and an effective permeation area thereof was 140 cm$^2$.

After the respective reverse osmosis membranes that had been washed were installed on the permeation cell, a preliminary operation was sufficiently conducted, using tertiary distilled water for about 1 hour in order to stabilize the evaluation equipment. Next, after the tertiary distilled water was substituted with 32,000 ppm of an aqueous sodium chloride (NaCl) solution and an equipment operation was conducted for about 1 hour until pressure and water transmittance reached a normal state, an amount of water permeated for 10 minutes under conditions including 32,000 ppm of the aqueous sodium chloride (NaCl) solution, a flow rate of 4,500 ml/min, a pressure of 800 psi, and a temperature of 25° C. was measured to calculate fluxes. In addition, under the same conditions described above, salt concentrations before and after the permeation were analyzed using a conductivity meter to calculate salt rejection rates.

Initial salt rejection rates and initial permeate fluxes were measured with respect to the reverse osmosis membranes obtained according to the Examples 1 to 8 and Comparative Examples 1 to 4, and results thereof are shown in the following Table 1.

TABLE 1

| Classification | Initial salt rejection rate (%) | Initial permeate flux (GFD) |
|---|---|---|
| Example 1 | 98.34 | 36.61 |
| Example 2 | 98.99 | 42.03 |
| Example 3 | 97.83 | 51.75 |
| Example 4 | 97.46 | 48.81 |
| Example 5 | 97.59 | 42.91 |
| Example 6 | 99.70 | 39.97 |
| Example 7 | 98.06 | 39.13 |
| Example 8 | 98.01 | 40.59 |
| Comparative Example 1 | 98.14 | 34.50 |
| Comparative Example 2 | 97.80 | 35.77 |
| Comparative Example 3 | 97.52 | 36.16 |
| Comparative Example 4 | 93.97 | 49.84 |

In the cases of Examples 1, 2, 6, 7 and 8, the initial salt rejection rate and the initial permeate flux were both increased, as compared to the Comparative Examples. In addition, in the cases of Examples 3 to 5, in which MFI type zeolite having a particle diameter of 80 to 200 nm was used, the salt rejection rate ranged from about 97.5 to 97.8 and maintained to be equal to or greater than those of other Examples, while the permeate flux was significantly improved. Thus, even in a case in which the difference between the maximum particle diameter and the minimum particle diameter of the surface-treated zeolite was about 120 nm, it could be confirmed that effects according to the present invention were obtained.

Meanwhile, in the case of Comparative Example 4 in which the zeolite was surface-treated with chlorodimethyl octadecylsilane, the initial salt rejection rate was significantly low, in a range of approximately 93.97%, decreased by about 5% as compared to that of Example 1. This is because that when the zeolite surface-treated with chlorodimethyl octadecylsilane was added at the time of forming the polyamide active layer through interfacial polymerization, a linear structure of the chlorodimethyl octadecylsilane may cause defects in an interface, such that the zeolite may not be smoothly bonded to the polyamide active layer.

While the present invention has been shown and described in connection with the embodiments, it will be apparent to those skilled in the art that modifications and variations can be made without departing from the spirit and scope of the invention as defined by the appended claims.

The invention claimed is:

1. A reverse osmosis membrane comprising:
   a porous support; and
   a polyamide active layer formed on the porous support and including zeolite, surface-treated with a compound having a glycidyl group,
   wherein the zeolite has an MFI (Zeolite Socony Mobil-five) type structure, and
   wherein a difference between a maximum particle diameter and a minimum particle diameter of the surface-treated zeolite is 10 to 200 nm.

2. The reverse osmosis membrane of claim 1, wherein the compound is a silane compound having a glycidyl functional group.

3. The reverse osmosis membrane of claim 1, wherein an average particle diameter of the surface-treated zeolite is 50 to 200 nm.

4. A method of manufacturing a reverse osmosis membrane, the method comprising:

forming a porous support; and forming a polyamide active layer on the porous support by interfacially polymerizing a polyfunctional amine solution including zeolite surface-treated with a compound having a glycidyl functional group and a polyfunctional acid halide compound solution, wherein the zeolite has an MFI (Zeolite Socony Mobil-five) type structure, and wherein a difference between a maximum particle diameter and a minimum particle diameter of the surface-treated zeolite is 10 to 200 nm.

5. The method of claim 4, wherein the surface-treated zeolite is included in an amount of 0.001 wt % to 1 wt %, with respect to 100 wt % of the polyfunctional amine solution.

* * * * *